United States Patent
Hunter et al.

(10) Patent No.: US 12,110,773 B2
(45) Date of Patent: *Oct. 8, 2024

(54) HYBRID DRIVE SYSTEMS FOR WELL STIMULATION OPERATIONS

(71) Applicant: Halliburton Energy Services, Inc., Houston, TX (US)

(72) Inventors: Timothy Holiman Hunter, Duncan, OK (US); Stanley Vernon Stephenson, Duncan, OK (US); Billy Don Coskrey, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,556

(22) Filed: Jan. 23, 2024

(65) Prior Publication Data

US 2024/0159134 A1 May 16, 2024

Related U.S. Application Data

(63) Continuation of application No. 17/738,995, filed on May 6, 2022, now Pat. No. 11,913,316, which is a
(Continued)

(51) Int. Cl.
*E21B 43/26* (2006.01)
*E21B 41/00* (2006.01)
(Continued)

(52) U.S. Cl.
CPC ...... *E21B 43/2607* (2020.05); *E21B 41/0085* (2013.01); *E21B 43/25* (2013.01);
(Continued)

(58) Field of Classification Search
CPC ...... E21B 43/25; E21B 41/0085; E21B 43/26; E21B 43/2607; E21B 43/267; F04B 15/02;
(Continued)

(56) References Cited

U.S. PATENT DOCUMENTS

| | | | |
|---|---|---|---|
| 2,208,568 | A | 7/1940 | Benedek |
| 2,634,682 | A | 4/1953 | Huber |

(Continued)

FOREIGN PATENT DOCUMENTS

| | | |
|---|---|---|
| CA | 2707269 A1 | 12/2010 |
| CA | 2773843 A1 | 10/2012 |

(Continued)

OTHER PUBLICATIONS

Efficient and environmental solutions commercialized shale gas exploitation in Sichuan Basin, Honghua Group, 35 pages, www.hh-gltd.com.

(Continued)

*Primary Examiner* — Peter J Bertheaud
(74) *Attorney, Agent, or Firm* — John Wustenberg; Baker Botts L.L.P.

(57) ABSTRACT

In accordance with presently disclosed embodiments, a hybrid drive system that uses multiple sources of mechanical energy to drive a pump is provided. The hybrid drive system may include a first mover for generating first mechanical energy, a pump, a drivetrain for providing first mechanical energy from the first mover to the pump, and a second mover within the drivetrain to generate and provide second mechanical energy to the pump. The multiple sources of mechanical energy may provide flexibility with respect to system design and allow for alternative sources of fuel and energy to be used to drive pumping systems. This may reduce the total diesel fuel consumption necessary to per- (Continued)

form a well stimulation operation as well as provide for configurations in which diesel engines may be excluded from the pumping process in favor of alternative energy sources that typically do not have sufficient torque capacity to power a pump.

25 Claims, 3 Drawing Sheets

Related U.S. Application Data continuation of application No. 16/321,155, filed as application No. PCT/US2016/050196 on Sep. 2, 2016, now Pat. No. 11,421,673.

(51) Int. Cl.

| | |
|---|---|
| *E21B 43/25* | (2006.01) |
| *E21B 43/267* | (2006.01) |
| *F04B 15/02* | (2006.01) |
| *F04B 17/03* | (2006.01) |
| *F04B 17/05* | (2006.01) |
| *F04B 17/06* | (2006.01) |
| *F04B 47/00* | (2006.01) |
| *F04B 47/02* | (2006.01) |
| *F04D 13/02* | (2006.01) |
| *F04D 13/06* | (2006.01) |

(52) U.S. Cl.
CPC ............ *E21B 43/26* (2013.01); *E21B 43/267* (2013.01); *F04B 15/02* (2013.01); *F04B 17/03* (2013.01); *F04B 17/05* (2013.01); *F04B 17/06* (2013.01); *F04B 47/00* (2013.01); *F04B 47/02* (2013.01); *F04D 13/02* (2013.01); *F04D 13/06* (2013.01)

(58) Field of Classification Search
CPC .......... F04B 17/03; F04B 17/05; F04B 17/06; F04B 47/00; F04B 47/02
See application file for complete search history.

(56) References Cited

U.S. PATENT DOCUMENTS

| | | |
|---|---|---|
| 2,775,204 A | 12/1956 | Batten et al. |
| 3,291,234 A | 12/1966 | Woodburn |
| 3,381,943 A | 5/1968 | Miller |
| 3,591,147 A | 7/1971 | Anderson et al. |
| 3,764,233 A | 10/1973 | Strickland |
| 3,773,438 A | 11/1973 | Hall et al. |
| 3,792,790 A | 2/1974 | Brubaker |
| 3,891,354 A | 6/1975 | Bosch |
| 3,893,655 A | 7/1975 | Sandiford |
| 3,931,999 A | 1/1976 | McCain |
| 3,961,562 A | 6/1976 | Kersten et al. |
| 3,985,472 A | 10/1976 | Virtue et al. |
| 4,159,623 A | 7/1979 | Mcreynolds |
| 4,265,266 A | 5/1981 | Kierbow et al. |
| 4,272,224 A | 6/1981 | Kabele |
| 4,341,508 A | 7/1982 | Rambin |
| 4,470,771 A | 9/1984 | Hall et al. |
| 4,701,095 A | 10/1987 | Berryman et al. |
| 4,730,118 A | 3/1988 | Quarles et al. |
| 4,850,750 A | 7/1989 | Cogbill et al. |
| 4,854,714 A | 8/1989 | Davis et al. |
| 5,127,450 A | 7/1992 | Saatkamp |
| 5,165,862 A | 11/1992 | Lindblom |
| 5,181,837 A | 1/1993 | Niemiec |
| 5,261,796 A | 11/1993 | Niemiec et al. |
| 5,318,382 A | 6/1994 | Cahill |
| 5,320,501 A | 6/1994 | Langosch et al. |
| 5,422,550 A | 6/1995 | Mcclanahan et al. |
| 5,439,066 A | 8/1995 | Gipson |
| 5,452,954 A | 9/1995 | Handke et al. |
| 5,465,798 A | 11/1995 | Edlund et al. |
| 5,606,853 A | 3/1997 | Birch et al. |
| 5,752,768 A | 5/1998 | Assh |
| 5,775,881 A | 7/1998 | Stich |
| 5,819,848 A | 10/1998 | Rasmuson et al. |
| 5,865,247 A | 2/1999 | Paterson et al. |
| 5,923,136 A | 7/1999 | Baerd |
| 5,941,305 A | 8/1999 | Thrasher et al. |
| 6,002,063 A | 12/1999 | Bilak et al. |
| 6,059,539 A | 5/2000 | Nyilas et al. |
| 6,167,965 B1 | 1/2001 | Bearden et al. |
| 6,321,860 B1 | 11/2001 | Reddoch |
| 6,375,436 B1 | 4/2002 | Irie et al. |
| 6,414,455 B1 | 7/2002 | Watson |
| 6,634,173 B2 | 10/2003 | Linster et al. |
| 6,640,912 B2 | 11/2003 | Reddoch |
| 6,773,238 B1 | 8/2004 | Sprakel |
| 6,952,929 B2 | 10/2005 | Inoue et al. |
| 7,124,589 B2 | 10/2006 | Neary |
| 7,173,399 B2 | 2/2007 | Sihler et al. |
| 7,245,033 B2 | 7/2007 | Wurtele |
| 7,353,875 B2 | 4/2008 | Stephenson et al. |
| 7,451,812 B2 | 11/2008 | Cooper et al. |
| 7,619,324 B2 | 11/2009 | Folken et al. |
| 7,640,738 B1 | 1/2010 | Hauser et al. |
| 7,690,198 B2 | 4/2010 | Rousseau et al. |
| 7,717,193 B2 | 5/2010 | Egilsson et al. |
| 7,836,949 B2 | 11/2010 | Dykstra |
| 7,841,394 B2 | 11/2010 | Mcneel et al. |
| 7,845,413 B2 | 12/2010 | Allan et al. |
| 7,931,082 B2 | 4/2011 | Surjaatmadja |
| 7,949,483 B2 | 5/2011 | Discenzo et al. |
| 8,146,665 B2 | 4/2012 | Neal |
| 8,282,823 B2 | 10/2012 | Acernese et al. |
| 8,339,090 B2 | 12/2012 | Van Spengen |
| 8,444,312 B2 | 5/2013 | Hagan et al. |
| 8,456,116 B2 | 6/2013 | Burdick |
| 8,503,180 B2 | 8/2013 | Nojima |
| 8,506,267 B2 | 8/2013 | Gambier et al. |
| 8,523,533 B1 | 9/2013 | Best |
| 8,564,233 B2 | 10/2013 | Kidd et al. |
| 8,590,614 B2 | 11/2013 | Surjaatmadja et al. |
| 8,668,465 B2 | 3/2014 | Wadsley et al. |
| 8,789,601 B2 | 7/2014 | Broussard et al. |
| 8,794,307 B2 | 8/2014 | Coquilleau et al. |
| 8,801,407 B2 | 8/2014 | Simpson |
| 8,874,393 B2 | 10/2014 | Nagai et al. |
| 8,997,904 B2 | 4/2015 | Cryer et al. |
| 9,016,383 B2 | 4/2015 | Allan et al. |
| 9,103,193 B2 | 8/2015 | Coli et al. |
| 9,121,257 B2 | 9/2015 | Coli et al. |
| 9,121,402 B2 | 9/2015 | Marshall et al. |
| 9,140,110 B2 | 9/2015 | Coli et al. |
| 9,188,114 B2 | 11/2015 | Kuttler et al. |
| 9,316,216 B1 | 4/2016 | Cook et al. |
| 9,366,114 B2 | 6/2016 | Coli et al. |
| 9,395,049 B2 | 7/2016 | Vicknair et al. |
| 9,410,410 B2 | 8/2016 | Broussard et al. |
| 9,534,473 B2 | 1/2017 | Morris et al. |
| 9,579,980 B2 * | 2/2017 | Cryer .................... B60K 6/485 |
| 9,611,728 B2 | 4/2017 | Oehring |
| 9,650,871 B2 | 5/2017 | Oehring et al. |
| 9,650,879 B2 | 5/2017 | Broussard et al. |
| 9,745,840 B2 | 8/2017 | Oehring et al. |
| 9,840,901 B2 | 12/2017 | Oehring et al. |
| 9,850,422 B2 | 12/2017 | Lestz et al. |
| 9,893,500 B2 | 2/2018 | Oehring et al. |
| 9,915,129 B2 | 3/2018 | Newell et al. |
| 9,945,365 B2 | 4/2018 | Hernandez et al. |
| 9,970,278 B2 | 5/2018 | Broussard et al. |
| 9,995,218 B2 | 6/2018 | Oehring et al. |
| 10,020,711 B2 | 7/2018 | Oehring et al. |
| 10,036,238 B2 | 7/2018 | Oehring |
| 10,119,380 B2 | 11/2018 | Joseph et al. |
| 10,119,381 B2 | 11/2018 | Oehring et al. |
| 10,232,332 B2 | 3/2019 | Oehring et al. |
| 10,254,732 B2 | 4/2019 | Oehring et al. |

(56) References Cited

U.S. PATENT DOCUMENTS

| | | | |
|---|---|---|---|
| 10,337,308 B2 | 7/2019 | Broussard et al. | |
| 10,662,765 B2 | 5/2020 | Ferguson et al. | |
| 11,421,673 B2* | 8/2022 | Coskrey | F04B 17/05 |
| 11,808,127 B2* | 11/2023 | Coskrey | F04B 17/06 |
| 2001/0000996 A1 | 5/2001 | Grimland et al. | |
| 2003/0057704 A1 | 3/2003 | Baten et al. | |
| 2003/0161212 A1 | 8/2003 | Neal et al. | |
| 2003/0170077 A1 | 9/2003 | Herd et al. | |
| 2004/0008571 A1 | 1/2004 | Coody et al. | |
| 2005/0116541 A1 | 6/2005 | Seiver | |
| 2006/0007775 A1 | 1/2006 | Dean | |
| 2006/0168955 A1 | 8/2006 | Longfield et al. | |
| 2007/0078614 A1 | 4/2007 | Discenzo et al. | |
| 2007/0125543 A1 | 6/2007 | McNeel et al. | |
| 2007/0125544 A1 | 6/2007 | Robinson et al. | |
| 2007/0201305 A1 | 8/2007 | Heilman et al. | |
| 2007/0269317 A1 | 11/2007 | Clancy | |
| 2007/0277982 A1 | 12/2007 | Allan et al. | |
| 2008/0017369 A1 | 1/2008 | Sarada | |
| 2008/0029267 A1 | 2/2008 | Shampine et al. | |
| 2008/0066911 A1 | 3/2008 | Luharuka et al. | |
| 2008/0131295 A1 | 6/2008 | Koehl | |
| 2008/0135238 A1 | 6/2008 | Cugnet et al. | |
| 2008/0164021 A1 | 7/2008 | Dykstra | |
| 2008/0165612 A1 | 7/2008 | Dykstra | |
| 2008/0165613 A1 | 7/2008 | Dykstra | |
| 2008/0203734 A1 | 8/2008 | Grimes et al. | |
| 2008/0236818 A1 | 10/2008 | Dykstra | |
| 2008/0264641 A1 | 10/2008 | Slabaugh et al. | |
| 2008/0314807 A1 | 12/2008 | Junghanns et al. | |
| 2009/0068031 A1 | 3/2009 | Gambier et al. | |
| 2009/0090504 A1 | 4/2009 | Weightman et al. | |
| 2009/0101410 A1 | 4/2009 | Egilsson et al. | |
| 2009/0120635 A1 | 5/2009 | Neal | |
| 2009/0178387 A1 | 7/2009 | Schultz et al. | |
| 2009/0260826 A1 | 10/2009 | Sherwood et al. | |
| 2009/0261599 A1 | 10/2009 | Alston et al. | |
| 2009/0308602 A1 | 12/2009 | Bruins et al. | |
| 2009/0312885 A1 | 12/2009 | Buiel | |
| 2010/0038907 A1 | 2/2010 | Hunt et al. | |
| 2010/0051272 A1 | 3/2010 | Loree et al. | |
| 2010/0054959 A1 | 3/2010 | Rogers et al. | |
| 2010/0068071 A1 | 3/2010 | Bowden | |
| 2010/0071899 A1 | 3/2010 | Coquilleau et al. | |
| 2010/0083649 A1 | 4/2010 | Woodmansee et al. | |
| 2010/0133901 A1 | 6/2010 | Zhang et al. | |
| 2010/0169030 A1 | 7/2010 | Parlos | |
| 2010/0231146 A1 | 9/2010 | Beck et al. | |
| 2010/0263861 A1 | 10/2010 | Dykstra | |
| 2010/0310384 A1 | 12/2010 | Stephenson et al. | |
| 2010/0326663 A1 | 12/2010 | Bobier et al. | |
| 2011/0061855 A1 | 3/2011 | Case et al. | |
| 2011/0085924 A1 | 4/2011 | Shampine et al. | |
| 2011/0148209 A1 | 6/2011 | Williams | |
| 2011/0197988 A1 | 8/2011 | Van Vliet et al. | |
| 2011/0309055 A1 | 12/2011 | Rozmarynowski et al. | |
| 2012/0001482 A1 | 1/2012 | Burdick | |
| 2012/0049625 A1 | 3/2012 | Hopwood | |
| 2012/0073670 A1 | 3/2012 | Lymberopoulos | |
| 2012/0085541 A1 | 4/2012 | Love et al. | |
| 2012/0166096 A1 | 6/2012 | Stephenson et al. | |
| 2012/0205119 A1 | 8/2012 | Wentworth et al. | |
| 2012/0223524 A1 | 9/2012 | Williams | |
| 2012/0255734 A1 | 10/2012 | Coli et al. | |
| 2012/0292992 A1 | 11/2012 | Williams | |
| 2013/0032540 A1 | 2/2013 | Acernese et al. | |
| 2013/0045117 A1 | 2/2013 | Wishart | |
| 2013/0233542 A1 | 9/2013 | Shampine et al. | |
| 2013/0271083 A1 | 10/2013 | Williams | |
| 2013/0276430 A1 | 10/2013 | Ulrich et al. | |
| 2013/0284422 A1 | 10/2013 | Irvine | |
| 2013/0305851 A1 | 11/2013 | Rees et al. | |
| 2013/0306322 A1 | 11/2013 | Sanborn et al. | |
| 2013/0308414 A1 | 11/2013 | Lucas | |
| 2014/0008074 A1 | 1/2014 | Nevison | |
| 2014/0048253 A1 | 2/2014 | Andreychuk | |
| 2014/0096974 A1 | 4/2014 | Coli et al. | |
| 2014/0130509 A1 | 5/2014 | Drnevich et al. | |
| 2014/0138079 A1 | 5/2014 | Broussard et al. | |
| 2014/0147291 A1 | 5/2014 | Burnette | |
| 2014/0158345 A1 | 6/2014 | Jang et al. | |
| 2014/0174717 A1 | 6/2014 | Broussard et al. | |
| 2014/0219824 A1 | 8/2014 | Burnette | |
| 2014/0251623 A1 | 9/2014 | Lestz et al. | |
| 2014/0255214 A1 | 9/2014 | Burnette | |
| 2014/0261695 A1 | 9/2014 | Dehring et al. | |
| 2014/0262292 A1 | 9/2014 | Joseph et al. | |
| 2014/0290768 A1 | 10/2014 | Randle et al. | |
| 2014/0294599 A1 | 10/2014 | Wi et al. | |
| 2014/0294603 A1 | 10/2014 | Best | |
| 2014/0298846 A1 | 10/2014 | Taras et al. | |
| 2015/0027712 A1 | 1/2015 | Vicknair et al. | |
| 2015/0078924 A1 | 3/2015 | Zhang et al. | |
| 2015/0114652 A1 | 4/2015 | Lestz et al. | |
| 2015/0136043 A1 | 5/2015 | Shaaban et al. | |
| 2015/0144336 A1 | 5/2015 | Hardin et al. | |
| 2015/0211512 A1 | 7/2015 | Wiegman et al. | |
| 2015/0252661 A1 | 9/2015 | Glass | |
| 2015/0275891 A1 | 10/2015 | Chong | |
| 2015/0300336 A1 | 10/2015 | Hernandez et al. | |
| 2015/0322761 A1 | 11/2015 | Hodgson et al. | |
| 2015/0353816 A1 | 12/2015 | Thrash et al. | |
| 2015/0354322 A1 | 12/2015 | Vicknair et al. | |
| 2016/0032691 A1 | 2/2016 | Richter et al. | |
| 2016/0032703 A1 | 2/2016 | Broussard et al. | |
| 2016/0055737 A1 | 2/2016 | Boken | |
| 2016/0105022 A1 | 4/2016 | Oehring et al. | |
| 2016/0177675 A1 | 6/2016 | Morris et al. | |
| 2016/0177678 A1 | 6/2016 | Morris et al. | |
| 2016/0194942 A1 | 7/2016 | Wiegman et al. | |
| 2016/0208592 A1 | 7/2016 | Oehring | |
| 2016/0221843 A1 | 8/2016 | Acernese et al. | |
| 2016/0230525 A1 | 8/2016 | Lestz et al. | |
| 2016/0258267 A1 | 9/2016 | Payne et al. | |
| 2016/0281484 A1 | 9/2016 | Lestz et al. | |
| 2016/0290114 A1 | 10/2016 | Oehring et al. | |
| 2016/0298425 A1 | 10/2016 | Thrash | |
| 2016/0312108 A1 | 10/2016 | Lestz et al. | |
| 2016/0319650 A1 | 11/2016 | Oehring et al. | |
| 2016/0326854 A1 | 11/2016 | Broussard et al. | |
| 2016/0348479 A1 | 12/2016 | Oehring et al. | |
| 2017/0016433 A1 | 1/2017 | Chong et al. | |
| 2017/0021318 A1 | 1/2017 | Mciver et al. | |
| 2017/0028368 A1 | 2/2017 | Oehring et al. | |
| 2017/0030177 A1 | 2/2017 | Oehring et al. | |
| 2017/0107804 A1 | 4/2017 | Krug et al. | |
| 2017/0114625 A1 | 4/2017 | Norris et al. | |
| 2017/0226998 A1 | 8/2017 | Zhang et al. | |
| 2018/0230778 A1 | 8/2018 | Thrash | |

FOREIGN PATENT DOCUMENTS

| | | |
|---|---|---|
| CN | 1877079 A | 12/2006 |
| CN | 102602322 A | 7/2012 |
| CN | 202463670 U | 10/2012 |
| CN | 202544803 U | 11/2012 |
| CN | 202560199 U | 11/2012 |
| DE | 19846940 A1 | 4/2000 |
| DE | 102005018324 A1 | 10/2006 |
| EP | 1927750 A2 | 6/2008 |
| GB | 453231 A | 9/1936 |
| WO | 2001094786 A1 | 12/2001 |
| WO | 2004107534 A1 | 12/2004 |
| WO | 2007113528 A1 | 10/2007 |
| WO | 2010023489 A1 | 3/2010 |
| WO | 2013148342 A1 | 10/2013 |
| WO | 2014105642 A1 | 7/2014 |
| WO | 2014177346 A1 | 11/2014 |
| WO | 2015011223 A2 | 1/2015 |

(56) References Cited

OTHER PUBLICATIONS

"Evolution Well Services Advances Fracturing Operations with a Electrically Powered System," News Provided by Evolution Well Services, Jun. 4, 2012, 1 page.
"Field Gas Becomes Fuel Source for Pumps at Drillsite," HartEnergy Newsletter, Sep. 17, 2013, 3 pages.
"Game-changing hydraulic fracturing technology, reduces emissions by 99%," U.S. Well Services, Globe Newswire, Oct. 1, 2014, 2 pages.
"Green Field Energy Services and GE signs natural gas powered equipment agreement," LNG Processing Technology, Jan. 7, 2013, 9 pages, https://www.hydrocarbons-technology.com/uncategorised/newsgreen-field-energy-services-and-ge-signs-natural-gas-powered-equipment-agreement/.
"Green Field Energy Services Conducts First-Ever Frac Pump Test Powered 100% by Field Gas," News Provided by Green Field Energy Services, PRNewswire, Jan. 3, 2013, 2 pages.
"Honghua Group and Baker Hughes Collaborate to Explore and Develop China's Unconventional Hydrocarbons Market," Honghua Group Limited, Dec. 12, 2012, 2 pages.
"Honghua Group Introduces 6,000-hp integrated shale gas system," Drilling Contractor, May 21, 2012, 3 pages, https://www.drillingcontractor.org/honghua-introduces-6,000-hp-integrated-shale-gas-system.
"Honghua Group Showcases Shale Gas, Offshore and Land Drilling Solutions at the 2013 Offshore Technology Conference," BusinessWire, May 6, 2013, 2 pages.
"Honghua Group to Launch Integrated Shale Gas Exploitation Solution at OTC 2012," AP Alert-Energy, May 1, 2012, 4 pages.
"Honghua: Hh Group Showcases Offshore and Land Drilling Technology Along with Shale Gas Solutions at the 2014 Offshore Technology Conference," May 6, 2014, 4 pages.
"Turbine Frac Units," WMD Squared, 2012, 5 pages, https://wmdsquared.com/work/gfes-turbine-frac-units/.
"USA: Green Field Energy, GE Ink Deal on Gas Powered Equipment," Offshore Energy, Jan. 8, 2013, 4 pages, https://www.offshore-energy.biz/USA-green-field-energy-ge-ink-deal-on-gas-powered-equipment/.
"The Jet Frac Revolution," Turbine Stimulation Technologies, BIC Magazine, Apr. 2006, 3 pages.
1966 Halliburton Sales and Service Catalog, 3 pages.
Archive of MTT Website, available at https://web.archive.org/web/20090615185330/marineturbine.com/frac.asp, Jun. 15, 2009, 3 pages.
Black Diamond Claim Chart for U.S. Pat. No. 9,410,410, U.S. Well Services, LLC v. TOPS Well Services, LLC et al., Case 3:19-cv-00237, Document 76-11 (S.D. Tex.), Apr. 29, 2020, 31 pages.
Boman, Karen, "Turbine Technology Powers Green Field Multi-Fuel Frack Pump," Rigzone, Mar. 7, 2013, 9 pages, https://www.rigzone.com/news/oil_gas/a/124883/turbine_technology_powers_green_field_multifuel_frack_pump/.
Brenner, Noah, "Dual fuel a nimble approach," Feb. 21, 2013, 1 page.
Examination Report issued in related Canadian Patent Application No. 3,030,829 mailed Oct. 8, 2021, 4 pages.
Examiner's Letter issued in related Canadian application No. 3,030,829, dated Feb. 10, 2020, 5 pages.
Excerpts from Equipment Data Report, Halliburton Energy Services, Duncan, OK, Mar. 23, 2012, 2 pages.
Excerpts from manual related to Halliburton Stim Star vessel, admitted as prior art, 7 pages.
Excerpts from Project Comprehensive Study Report, Sep. 2011, 2 pages.
Excerpts related to E-Powered Grizzly and E-Drive HT-400 pumps, Halliburton, admitted as prior art, 6 pages.
Hausfeld, et al., "TM2500+ Power for Hydraulic Fracturing," 20th Symposium of the Industrial Application of Gas Turbines Committee (13-IAGT-203), Banff, Alberta, Canada, Oct. 2013, 9 pages.
HHF-1600 Mud Pump, HongHua America, Inc., 5 pages, www.hh-america.com.
Honghua Group Limited, 2013 Annual Report, 192 pages.
Honghua Group Ltd. Manual, Jun. 2014, 42 pages, www.hh-gltd.com.
International Search Report and Written Opinion issued in PCT/GB2011/000678 mailed Oct. 12, 2012, 11 pages.
International Search Report and Written Opinion issued in related PCT Application No. PCT/US2016/050196 mailed May 26, 2017, 15 pages.
International Search Report in PCT/GB2010/001717 mailed May 10, 2011, 4 pages.
Invalidity Chart, Mud Pump and Associated Materials HHUS Sold to Nabors, *U.S. Well Services, LLC v. TOPS Well Services, LLC et al.*, Case 3:19-cv-00237, D.I. 76-13 (S.D. Tex.), Apr. 29, 2020, 135 pages.
Johnson, Luke, Honghua unveils natgas-powered drill system, May 3, 2012, 1 page.
Johnson, Luke, "Honghua unveils natgas-powered drill system," EPaper—Upstream Online, May 3, 2012, 2 pages.
Kever, Jeannie, OTC attendance zips past 100,000, Houston Chronicle, May 9, 2013, 8 pages, https://www.houstonchronicle.com/business/energy/conferences/article/OTC-attendance-zips-past-100-000-4504296.php.
New Simulation Vessel Service Proposal, Halliburton, Sep. 8, 2010, 7 pages.
Owen, Charlotte, "Chinese company launches new fracking rigs," Oil & Gas Technology, May 2, 2012, 2 pages, www.oilandgastechnology.net/upstream-news/chinese-company-launches-new-fracking-rigs.
Rig Equipment, HongHua America, LLC, 2011, 1 page, http://web.archive.org/web/20110205080538/http://www.hh-america.com:80/webfront/rig-equipment/.
Scott, Katherine, "Honghua developing new-generation shale-drilling rig, plans testing of frac pump," Drilling Contractor, May 23, 2013, 3 pages, https://www.drillingcontractor.org/honghua-developing-new-generation-shale-drilling-rig-plans-testing-of-frac-pump-23278.
Shauk, Zain, "Military copters recycled for fracking," SFGate, Jun. 1, 2013, 13 pages, https://www.sfgate.com/business/article/military-copters-recycled-for-fracking-4568836.php.
Shauk, Zain, "Redeployment: Battlefield engines take an oil field mission," Houston Chronicle, May 30, 2013, 10 pages, https://www.houstonchronicle.com/business/energy/article/Redeployment-Battlefield-engines-take-on-oil-4563553.php.
Spencer, Malia, "Green Field Energy Services lands in Monessen," Pittsburgh Business Times, Aug. 7, 2013, 7 pages, https://www.bizjournals.com/pittsburgh/blog/energy/2013/08/green-field-energy-services-lands-in-html.
Spencer, Malia, "Marcellus gas used to power come frack jobs," Pittsburgh Business Times, Jul. 2013, 9 pages, https://www.bizjournals.com/pittsburgh/blog/energy/2013/07/marcellus-gas-used-to-power-frack-some.html.
Stim Bar (Brasil) General Arrangement Drawing, Halliburton Energy Services, Inc., Dec. 6, 2013, 1 page.
United States Securities and Exchange Commission, Form S-4 for Green Field Energy Services, Inc., Hub City Tools, Inc. filed May 11, 2012, 206 pages, https://www.sec.gov.archives/edgar/data/1542387/000119312512228720/d349756ds5.htm.
Examiner's report in CA application 3,030,829 mailed Feb. 24, 2023, 4 pages.
E-Powered Grizzly and E-Drive HT-400 Pumps, Halliburton, available at least as of 2011, 6 pages.
Halliburton Stim Star vessel, Halliburton, available at least as of 2003, 7 pages.

* cited by examiner

HYBRID DRIVE SYSTEMS FOR WELL STIMULATION OPERATIONS

CROSS REFERENCE TO RELATED APPLICATIONS

The present application is a Continuation of U.S. patent application Ser. No. 17/738,995, filed May 6, 2022, which is a U.S. Continuation of U.S. patent application Ser. No. 16/321,155 filed Jan. 28, 2019, now U.S. Pat. No. 11,421,673, issued Aug. 23, 2022, which is a U.S. National Stage Application of International Application No. PCT/US2016/050196 filed Sep. 2, 2016, which are incorporated herein by reference in their entirety for all purposes.

TECHNICAL FIELD

The present disclosure relates generally to treatment operations for hydrocarbon wells, and more particularly, to hybrid drive systems for well stimulation operations.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Subterranean operations involve a number of different steps such as, for example, drilling a wellbore at a desired well site, treating and stimulating the wellbore to optimize production of hydrocarbons, and performing the necessary steps to produce and process the hydrocarbons from the subterranean formation.

Treating and stimulating a well bore can include, among other things, delivering various fluids (along with additives, proppants, gels, cement, etc.) to the wellbore under pressure and injecting those fluids into the wellbore. One example treatment and stimulation operation is a hydraulic fracturing operation in which the fluids are highly pressurized via pumping systems to create fractures in the subterranean formation. The pumping systems typically include high-pressure, reciprocating pumps driven through conventional transmissions by diesel engines, which are used due to their ability to provide high torque to the pumps. Over the course of a fracturing operation, however, the diesel engines may consume thousands of gallons of diesel fuel, which is expensive and can be difficult to supply in sufficient quantities in a well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The terms "couple" or "couples" as used herein are intended to mean either an indirect or a direct connection. Thus, if a first device couples to a second device, that connection may be through a direct connection, or through an indirect mechanical or electrical connection via other devices and connections. The term "fluidically coupled" or "in fluid communication" as used herein is intended to mean that there is either a direct or an indirect fluid flow path between two components.

The present disclosure is directed to a hybrid drive system that uses multiple sources of mechanical energy to drive a pump. The multiple sources of mechanical energy may provide flexibility with respect to system design and allow for alternative sources of fuel and energy to be used to drive on-site pumping systems. This may reduce the total diesel fuel consumption necessary to perform a well stimulation operation as well as provide for configurations in which diesel engines may be entirely excluded from the pumping process in favor of alternative mechanical energy sources, such as spark-ignited natural gas engines, that typically do not have sufficient torque capacity to power a well stimulation pump. Additionally, the use of a second source of mechanical energy may increase the useful life of pumping systems by providing a second system that can account for the reduced output torque that is characteristic of aging engines and motors.

Figure 1:
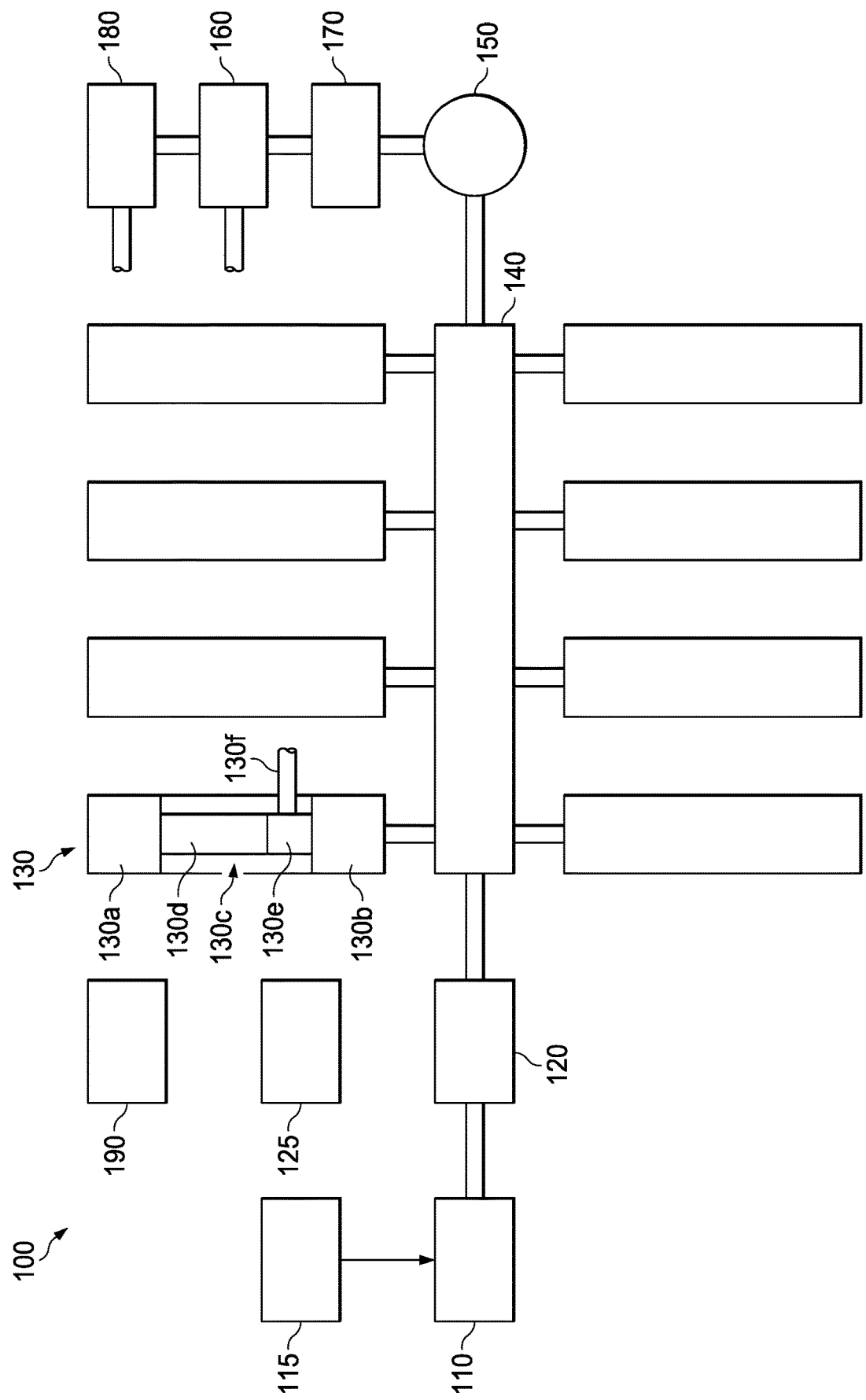
FIG. 1 is a diagram illustrating an example system for treatment operations, according to aspects of the present disclosure.

FIG. 1 is a diagram illustrating an example system 100 for treatment operations, according to aspects of the present disclosure. The system 100 includes a fluid management system 110 in fluid communication with a blender system 120. The blender system 120 may in turn be in fluid communication with one or more pump systems 130 through a fluid manifold system 140. The fluid manifold system 140 may provide fluid communication between the pump systems 130 and a wellbore 150. In use, the fluid management system 110 may receive water or another fluid from a fluid source 115 (e.g., a ground water source, a pond, one or more frac tanks), mix one or more fluid additives into the received water or fluid to produce a treatment fluid with a desired fluid characteristic, and provide the produced treatment fluid to the blender system 120. The blender system 120 may receive the produced treatment fluid from the fluid management system 110 and mix the produced treatment fluid with a proppant, such as sand, or another granular material 125 to produce a final treatment fluid that is directed to the fluid manifold 140. The pump systems 130 may then pressurize the final treatment fluid to generate pressurized final treatment fluid that is directed into the wellbore 150, where the pressurized final treatment fluid generates fractures within a formation in fluid communication with the wellbore 150.

An example one of the pump systems 130 may comprise a first mover 130a, a pump 130b, and a drive train 130c. As used herein, a mover may comprise any device that converts energy into mechanical energy to drive a pump. Example movers include, but are not limited to, electric motors, hydrocarbon-driven or steam engines, turbines, etc. The drive train 130c may be removably coupled to the first mover 130a and the pumps 130b through one or more drive shafts (not shown), and may comprise a transmission 130d with one or more gears that transmits mechanical energy from the first mover to the pump 130b. For instance, to the extent the pumps 130b comprise reciprocating pumps, the mechanical energy may comprise torque that drives the pump 130b.

The drive train 130c may further comprise a second mover 130e. As depicted, the second mover 130e is coupled to the transmission 130d between the transmission 130d and the pump 130b. In the embodiment shown, the second mover 130e may receive mechanical energy from the first mover 130a through the transmission 130d and provide the received mechanical energy to the pump 130b augmented by mechanical energy generated by the second mover 130e. It should be appreciated, however, that the orientation of the second mover 130e with respect to the first mover 130a, transmission 130d, and the pump 130b is not limited to the embodiment shown. In other embodiments, the second mover 130e may be positioned between the transmission 130d and the first mover 130a, for instance, or between elements of the transmission 130d itself. In yet other embodiments, the second mover 130e may be incorporated into the transmission 130d as part of a hybrid transmission system through which power from both the first mover 130a and second mover 130e are provided to the pump 130b.

The first mover 130a and second mover 130e may receive energy or fuel in one or more forms from sources at the wellsite. The energy or fuel may comprise, for instance, hydrocarbon-based fuel, electrical energy, hydraulic energy, thermal energy, etc. The sources of energy or fuel may comprise, for instance, on-site fuel tanks, mobile fuel tanks delivered to the site, electrical generators, hydraulic pumping systems, etc. The first mover 130a and second mover 130e may then convert the fuel or energy into mechanical energy that can be used to drive the associated pump 130b.

In the embodiment shown, the first mover 130a may comprise an internal combustion engine such as a diesel or dual fuel (e.g., diesel and natural gas) engine and the second mover 130e may comprise an electric motor. The internal combustion engine 130a may receive a source of fuel from one or more fuel tanks (not shown) that may located within the pumping system 130 and refilled as necessary using a mobile fuel truck driven on site. The electric motor 130e may be electrically coupled to a source of electricity through a cable 130f. Example sources of electricity include, but are not limited to, an on-site electrical generator, a public utility grid, one or more power storage elements, solar cells, wind turbines, other power sources, or one or more combinations of any of the previously listed sources.

As depicted, the source of electricity coupled the second mover 130e comprises a generator 160 located at the well site. The generator may comprise, for instance, a gas-turbine generator or an internal combustion engine that produces electricity to be consumed or stored on site. In the embodiment shown, the generator 160 may receive and utilize natural gas from the wellbore 150 or from another wellbore in the field (i.e., "wellhead gas") to produce the electricity. As depicted, the system 100 may include gas conditioning systems 170 that may receive the gas from the wellbore 150 or another source and condition the gas for use in the generator 160. Example gas conditioning systems include, but are not limited to, gas separators, gas dehydrators, gas filters, etc. In other embodiments, conditioned natural gas may be transported to the well site for use by the generator.

The system 100 may further include one or more energy storage devices 180 that may receive energy generated by the generator 160 or other on-site energy sources and store in one or more forms for later use. For instance, the storage devices 180 may store the electrical energy from the generator 160 as electrical, chemical, or mechanical energy, or in any other suitable form. Example storage devices 180 include, but are not limited to, capacitor banks, batteries, flywheels, pressure tanks, etc. In certain embodiments, the energy storage devices 180 and generator 160 may be incorporated into a power grid located on site through which at least some of the fluid management system 110, blender system 120, pump systems 130, and gas conditioning systems 170 may receive power.

In use, the first mover 130a and second mover 130e may operate in parallel or in series to drive the pump 130b, with the division of power between the movers being flexible depending on the application. For instance, in a multi-stage well stimulation operation, the formation may be fractured (or otherwise stimulated) in one or more "stages," with each stage corresponding to a different location within the formation. Each "stage" may be accompanied by an "active" period during which the pumps are engaged and pressurized fluids are being pumped into the wellbore 150 to fracture the formation, and an "inactive" period during which the pumps are not engaged while other ancillary operations are taking place. The transition between the "inactive" and "active" periods may be characterized by a sharp increase in torque requirement.

In an embodiment in which the first mover 130a comprises a diesel engine and the second mover 130e comprises an electric motor, both the diesel engine and electric motor may be engaged to provide the necessary power, with the percentage contribution of each depending on the period in which the system 100 is operating. For instance, during the "inactive" and "active" periods in which the torque requirements are relatively stable, the diesel engine, which operates more efficiently during low or near constant speed operations, may provide a higher percentage (or all) of the torque to the pump than the electric motor. In contrast, during transitions between "inactive" and "active" states, the electric motor may supplant the diesel engine as the primary source of torque to lighten the load on the diesel engine during these transient operations. In both cases, the electric motor reduces the torque required by the diesel engine, which reduces the amount of diesel fuel that must be consumed during the well stimulation operation. It should be noted that power sources could be used during continuous operation or intermittently as needed, including during transmission gear-shift events.

In addition to reducing the amount of diesel fuel needed to perform a well stimulation operation, the use of a first mover and a second mover in a pump system described herein may provide flexibility with respect to the types of movers that may be used. For instance, natural gas engines, i.e., internal combustion engines that use natural gas as their only source of combustion, are typically not used in oil field environments due to their limited torque capacity. By including two movers within the pump system 130, the torque capacity of the natural gas engine may be augmented to allow the use of a natural gas engine within the pump system 130. For instance, in certain embodiments, the first mover 130a may comprise a natural gas engine and the second mover 130e may comprise an electric motor that operates in series or parallel with the natural gas engine to provide the necessary torque to power the pump 130b.

In certain embodiments, the pump systems 130 may be electrically coupled to a controller 190 that directs the operation of the first and second movers of the systems 130. The controller 190 may comprise, for instance, an information handling system that sends one or more control signals to the pump systems 130 to control the speed/torque output of the first and second movers. As used herein an information handling system may comprise any system containing a processor and a memory device coupled to the processor containing a set of instructions that, when executed by the processor, cause the processor to perform certain functions. The control signals may take whatever form is necessary to communicate with the associated mover. For instance, a control signal to an electric motor may comprise an electrical control signal to a variable frequency drive coupled to the electric motor, which may receive the control signal and alter the operation of the electric motor based on the control signal. In certain embodiments, the controller 190 may also be electrically coupled to other elements of the system, including the fluid management system 110, blender system 120, pump systems 130, generator 160, and gas conditioning systems 170 in order to monitor and/or control the operation of the entire system 100. In other embodiments, some or all of the functionality associated with the controller 190 may be located on the individual elements of the system, e.g., each of the pump systems 130 may have individual controllers that direct the operation of the associated first and second movers.

It should be appreciated that only one example configuration is illustrated in FIG. 1 and that other embodiments and configurations are possible, depending on the types of movers and energy or fuel. In certain embodiments, some or all of the pumping systems 130 may include the same configuration, including the same types of first and second movers. The configurations of the individual pumping systems 130 and of the pumping systems generally may depend, for instance, on the available fuel and energy sources at the well site. For example, if a source of natural gas is more readily available than diesel fuel at a particular well site, the pumping systems 130 may be configured to utilize natural gas as a source of fuel/energy for both the first and second movers, which could include the use of a dual fuel or natural gas driven engine as the first mover and an electric motor powered by a natural-gas driven generator as the second mover.

Figure 2:
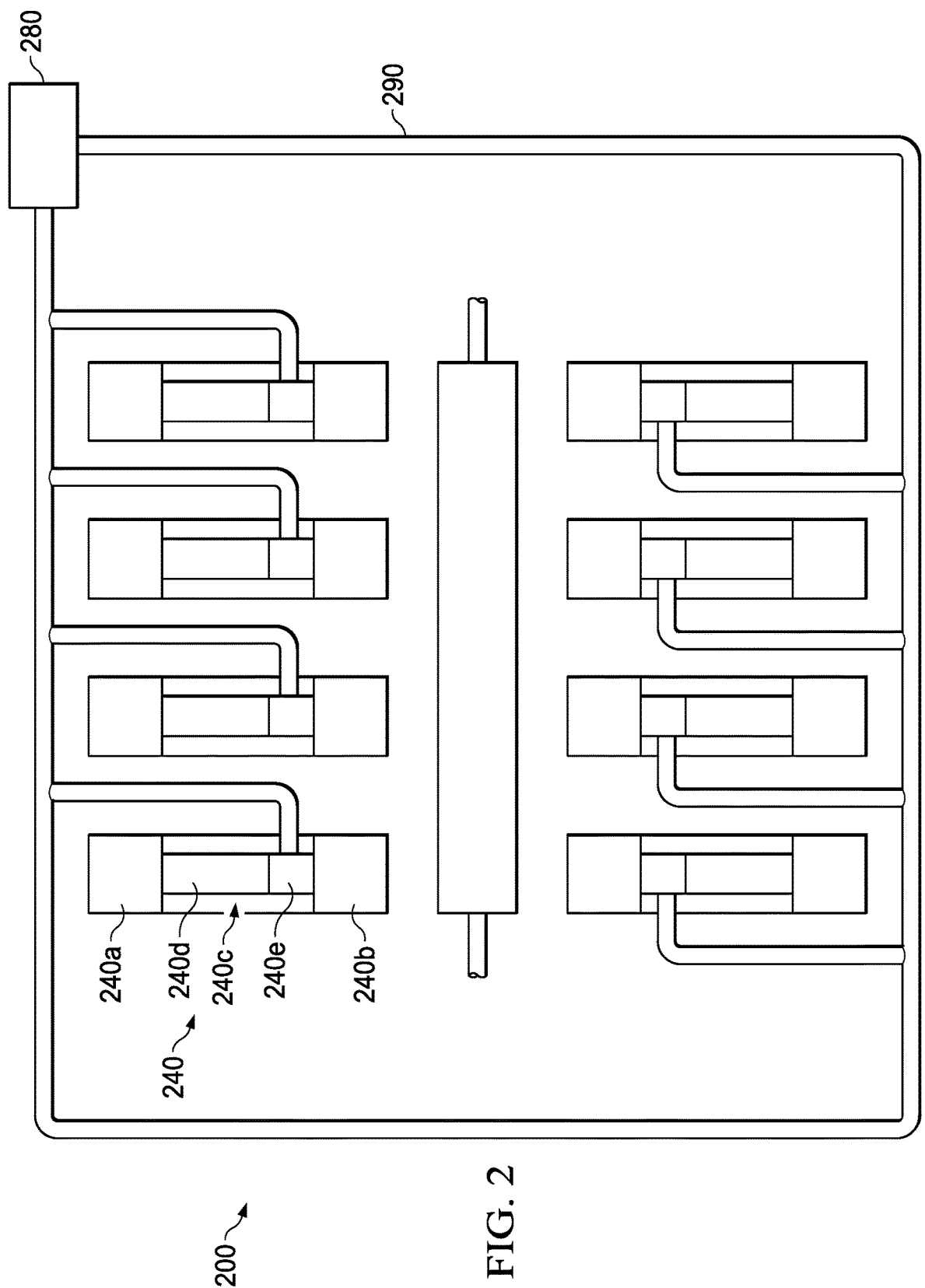
FIG. 2 is a diagram illustrating another example system for treatment operations, according to aspects of the present disclosure.

In certain embodiments, excess energy generated by the pumping systems 130 or other elements within the system 100 may be used as an energy source for the first and/or second movers. The excess energy may be used instead of or in addition to any of the energy and fuel sources described above. FIG. 2 is a diagram illustrating another example system 200 for treatment operations in which the excess energy is utilized, according to aspects of the present disclosure. As can be seen, the system 200 comprises similar pumping systems 240 to those described above with respect to FIG. 1. Notably, each of the pumps systems 240 may comprise a first mover 240a, a pump 240b and a drivetrain 240c comprising a transmission 240d and a second mover 240e. The second movers of the pumping systems 240 may comprise electric motors that function similarly to the electric motor described above with respect to FIG. 1.

In the embodiment shown, the second movers of the pumping systems 240 may themselves comprise sources of energy for the system 200. In particular, as can be seen, the second movers of the pumping systems 240 may be coupled to each other and to an energy storage device 280. During inactive periods, or periods with lower torque requirement by the pumps, the first movers of the system 200 may generate excess energy, particularly when the first movers comprise diesel engines that are left idling during "inactive" periods. During those periods, some or all of the second movers may function as generators, receiving the excess energy from the first movers and converting that excess energy into another form of energy for immediate use by other ones of the second movers within the system or for storage within the energy storage device 280. For instance, where the first movers comprise diesel engines and the second movers comprise electric motors, some or all of the electric motors may also function as electric generators used to generate electricity using the excess torque generated by the diesel engines, and that electricity may be consumed by other ones of the electric motors to immediately reduce the fuel consumption of the associated diesel engines and/or stored in the energy storage device 280 for later use.

Similarly, where the first movers comprise diesel engines and the second movers comprise hydraulic motors driven by pressurized hydraulic fluids, some or all of the hydraulic motors may use excess torque generated by the diesel engines to pressurize the hydraulic fluids for use by other ones of the hydraulic motors within the system 200 and/or for storage within the energy storage device 280 in the form of pressurized tank of hydraulic fluid. Other configurations are possible within the scope of this disclosure.

The embodiment show in FIG. 2 could also be used to increase the load on the engines (e.g., first movers) when the system is operating in cold ambient temperatures. The increased load may help to raise the exhaust temperatures of the engines during cold weather. This may enable heat sensitive aftertreatment emission devices to operate more efficiently and reliably, with less clogging of those systems as experienced during light loading of the engine with low exhaust temperatures. The excess motive energy output from the pumping systems 240 during this cold weather operation of the pumps may be converted into another form of energy via the second movers for immediate use by one of the other second movers or for storage in the energy storage device 280 for later use.

Figure 3:
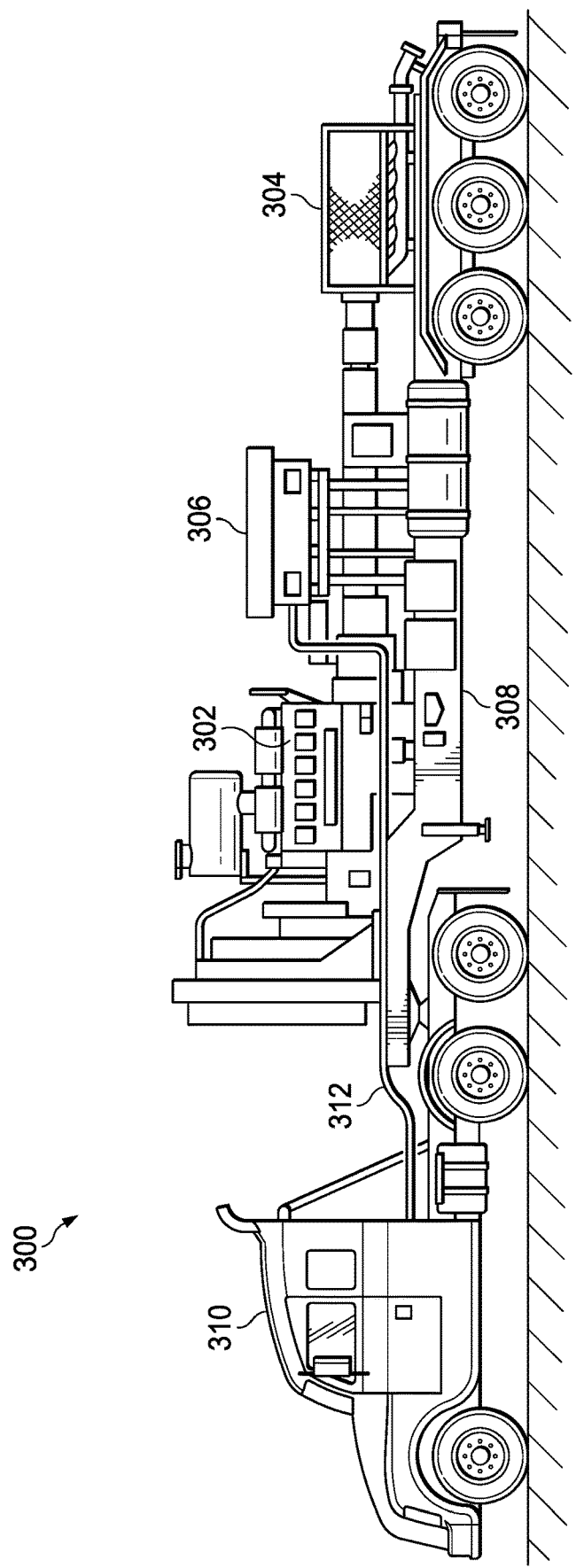
FIG. 3 is a diagram illustrating an example pumping system, according to aspects of the present disclosure.

FIG. 3 illustrates an example pumping system 300, according to aspects of the present disclosure. The pumping system 300 may be used, for instance, as one or more of the pumping systems described above with reference to FIGS. 1 and 2. As depicted, the system 300 comprises a first mover 302 in the form of a diesel engine coupled to a reciprocating pump 304 through a hybrid transmission system 306 into which a second mover in the form of an electric motor (or electric motor/generator) is integrated. The first mover 302, pump 304, and transmission system 306 are mounted on a trailer 308 coupled to a truck 310. The truck 310 may comprise, for instance, a conventional engine that provides locomotion to the truck 310 and trailer 310 through a hybrid transmission incorporating an electric motor or hydraulic system. The system 300 may further comprise an electrical connection 312, such as a cable, between the hybrid transmission of the truck 310 and the second mover in the pump transmission system 306.

In use, the truck 310 and trailer 308 with the pumping equipment mounted thereon may be driven to a well site at which a fracturing or other treatment operation will take place. In certain embodiments, the truck 310 and trailer 308 may be one of many similar trucks and trailers that are driven to the well site. Once at the site the pump 304 may be fluidically coupled to a wellbore (not shown), such as through a fluid manifold, to provide treatment fluid to the wellbore. The pump 304 may further be fluidically coupled to a source of treatment fluids to be pumped into the wellbore. When connected, the diesel engine may be started to provide a primary source of torque to the pump 304 through the pump transmission system 306. The electric motor in the pump transmission system 306 similar may be engaged to provide a supplemental source of torque to the pump 304. As depicted, the electric motor in the pump transmission system 306 may receive energy directly from the hybrid transmission of the truck 310, such that the truck itself operates as an electrical generator for the pumping operation. In addition to energy from the truck 310 and the electric motor in the pump transmission system 306, the pump may receive electricity from other energy sources on the site, including a dedicated electrical generator on site or other pumping systems located on the site.

Embodiments disclosed herein include:

A. An apparatus including a first mover for generating first mechanical energy, a pump, a drivetrain, and a second mover. The drivetrain provides the first mechanical energy from the first mover to the pump, and the second mover is disposed within the drivetrain to generate and provide second mechanical energy to the pump.

B. A system including a first pump system including a first mover for generating first mechanical energy, a pump, a drivetrain for providing first mechanical energy from the first mover to the pump, and a second mover within the drivetrain to generate and provide second mechanical energy to the pump. The system also includes a fluid manifold providing fluid communication between the pump and a wellbore, and at least one of a fluid management system and a blender unit providing a source of treatment fluids to the pump.

C. A method including generating first mechanical energy with a first mover mechanically coupled to a pump, generating second mechanical energy with a second mover mechanically coupled to the pump, and directing fluid from the pump to a wellbore using the first mechanical energy and the second mechanical energy.

Each of the embodiments A, B, and C may have one or more of the following additional elements in combination: Element 1: wherein the first mover includes one of a diesel engine or a dual fuel engine and the second mover includes at least one of an electric motor and a hydraulic motor. Element 2: wherein the first mover includes a natural gas spark-ignited engine and the second mover includes at least one of an electric motor and a hydraulic motor. Element 3: wherein the drivetrain includes a transmission and the second mover is coupled between the first mover and the transmission or between the transmission and the pump. Element 4: wherein the drivetrain includes a hybrid transmission into which the second mover is integrated. Element 5: wherein the pump includes a hybrid pump into which the second mover is integrated. Element 6: further including a trailer onto which the first mover, pump, drivetrain and second mover are mounted, and a truck coupled to the trailer, wherein the truck includes a diesel engine and a hybrid transmission with an integrated electric generator. Element 7: wherein the second mover is coupled to and receives energy from the integrated electric generator of the hybrid transmission. Element 8: further including an energy storage device to provide a source of energy to at least one of the first mover and the second mover to generate the respective first and second mechanical energy. Element 9: further including an electrical generator coupled to the energy storage device and at least one of the first mover and the second mover. Element 10: further including a gas conditioning system to receive natural gas from a wellbore and provide conditioned natural gas to the electrical generator from which the electrical generator generates electricity. Element 11: further including a second pump system with an other first mover, an other pump, an other drivetrain, and an other second mover. Element 12: wherein the second mover and the other second mover include electric motors electrically connected to share electrical energy. Element 13: wherein the electric motors are further electrically connected to an energy storage system for providing electricity to at least one of electric motors and storing energy generated by at least one electric generator.

Element 14: further including receiving the first mechanical energy at the pump through a drivetrain coupled between the first mover and the pump. Element 15: wherein generating second mechanical energy with the second mover includes generating second mechanical energy within the drivetrain. Element 16: wherein the first mover includes at least one of a diesel engine, a dual fuel engine, and a spark-ignited natural gas engine. Element 17: wherein the second mover includes at least one of an electric motor and a hydraulic motor. Element 18: wherein generating second mechanical energy with the second mover includes receiving at least one of electricity and pressurized hydraulic fluid from an energy storage device coupled to the second mover.

Although the present disclosure and its advantages have been described in detail, it should be understood that various changes, substitutions and alterations can be made herein without departing from the spirit and scope of the disclosure as defined by the following claims.

What is claimed is:

1. An apparatus, comprising:
   a first mover for generating a first mechanical energy, wherein the first mover comprises an internal combustion engine;
   a well stimulation pump;
   a second mover for generating a second mechanical energy, wherein the second mover is powered by electricity produced using natural gas, wherein at least a portion of the natural gas is obtained from a wellbore on-site; and
   a drivetrain for outputting a combination of the first and second mechanical energies to the well stimulation pump,
   wherein the combined first and second mechanical energies power the well stimulation pump to pump fluid to the wellbore.

2. The apparatus of claim 1, wherein the first mover comprises a diesel engine or a dual fuel engine.

3. The apparatus of claim 1, wherein the first mover comprises a spark-ignited natural gas engine.

4. The apparatus of claim 1, further comprising:
   a trailer onto which the first mover, the well stimulation pump, the drivetrain, and the second mover are mounted; and
   a truck coupled to the trailer, wherein the second mover is coupled to and receives energy from the truck.

5. The apparatus of claim 1, wherein the drivetrain includes a transmission, and wherein the second mover is coupled between the first mover and the transmission.

6. The apparatus of claim 1, wherein the drivetrain includes a transmission, and wherein the second mover is coupled between the transmission and the well stimulation pump.

7. The apparatus of claim 1, wherein the first mover and the second mover operate in parallel to power the well stimulation pump.

8. A system, comprising:
a pump system comprising:
a first mover for generating a first mechanical energy, wherein the first mover comprises an internal combustion engine;
a pump;
a second mover for generating a second mechanical energy, wherein the second mover is powered by electricity produced using natural gas, wherein at least a portion of the natural gas is obtained from a wellbore on-site; and
a drivetrain for outputting a combination of the first and second mechanical energies to the pump;
a fluid manifold for providing fluid communication between the pump and the wellbore; and
a blender unit for preparing a treatment fluid, wherein the treatment fluid is provided to the fluid manifold via the pump.

9. The system of claim 8, further comprising an electrical generator coupled to the second mover.

10. The system of claim 9, further comprising a gas conditioning system to produce conditioned natural gas from the natural gas obtained from the wellbore on-site, wherein the conditioned natural gas is used to power the electrical generator to generate electricity.

11. The system of claim 8, wherein the drivetrain includes a transmission, and wherein the second mover is coupled between the first mover and the transmission.

12. The system of claim 8, wherein the drivetrain includes a transmission, and wherein the second mover is coupled between the transmission and the pump.

13. The system of claim 8, wherein the first mover and the second mover operate in parallel to power the pump.

14. The system of claim 8, further comprising:
a trailer onto which the first mover, the pump, the drivetrain, and the second mover are mounted; and
a truck coupled to the trailer, wherein the second mover is coupled to and receives energy from the truck.

15. A method of performing an operation in a subterranean formation, comprising:
having a first mechanical energy from a diesel engine, a spark-ignited natural gas engine, or a dual fuel engine;
having a second mechanical energy from an electric motor, wherein the second mechanical energy is converted from electricity produced using natural gas, wherein at least a portion of the natural gas is obtained from a wellbore on-site;
combining the first and second mechanical energies;
outputting the combined first and second mechanical energies using a drivetrain to power a pump; and
pumping a fluid into the subterranean formation using the pump.

16. The method of claim 15, wherein the electric motor is used to provide the second mechanical energy, and wherein a generator is used to power the electric motor.

17. The method of claim 15, wherein the drivetrain includes a transmission, and wherein the electric motor or the hydraulic motor is coupled between the diesel engine, the spark-ignited natural gas engine, or the dual fuel engine and the transmission.

18. The method of claim 15, wherein the drivetrain includes a transmission, and wherein the electric motor or the hydraulic motor is coupled between the transmission and the pump.

19. The method of claim 15, wherein the diesel engine, the spark-ignited natural gas engine, or the dual fuel engine and the electric motor operate in parallel to power the pump.

20. A method of performing an operation in a subterranean formation, comprising:
combining a first mechanical energy and a second mechanical energy,
wherein the first mechanical energy is from a diesel engine, a spark-ignited natural gas engine, or a dual fuel engine, and
wherein the second mechanical energy is from an electric motor, wherein the second mechanical energy is converted from electricity produced using natural gas,
wherein at least a portion of the natural gas is obtained from a wellbore on-site;
using the combined first and second mechanical energies to power a pump; and
pumping a fluid into the subterranean formation using the pump.

21. The method of claim 20, wherein the first mechanical energy is from the spark-ignited natural gas engine, and the second mechanical energy is from the electric motor.

22. The method of claim 21, wherein a generator is used to produce electricity to power the electric motor.

23. The method of claim 22, wherein the generator receives all of the natural gas from the wellbore on-site.

24. The method of claim 22, wherein the natural gas comprises wellhead gas.

25. The method of claim 20, wherein the diesel engine, the spark-ignited natural gas engine, or the dual fuel engine and the electric motor operate in parallel to power the pump.

* * * * *